United States Patent
Rajanathan

[11] Patent Number: 5,834,863
[45] Date of Patent: Nov. 10, 1998

[54] ELECTROMAGNETIC ACTUATORS

[75] Inventor: Chinniah B. Rajanathan, Dundee, Scotland

[73] Assignee: NCR Corporation, Dayton, Ohio

[21] Appl. No.: 924,448

[22] Filed: Aug. 28, 1997

[30] Foreign Application Priority Data

Feb. 4, 1997 [GB] United Kingdom .................. 9702192

[51] Int. Cl.$^6$ .................................................. H02K 41/00
[52] U.S. Cl. .............................................. 310/14; 310/12
[58] Field of Search .................................. 310/12, 13, 14, 310/23, 24, 34, 35; 269/8, 58, 216, 239

[56] References Cited

U.S. PATENT DOCUMENTS

| 4,473,763 | 9/1984 | McFarland | 310/24 |
| 5,732,938 | 3/1998 | Rajanathan | 269/216 |

OTHER PUBLICATIONS

European Patent Application No. 96303854.2; filed May 29, 1996; entitled "An Actuation Apparatus"; by inventor Chinniah B. Rajanathan et al.; assigned to NCR Corporation corresponding to U.S. Patent Application No. 08/589,439; filed Jan. 22, 1996.

*Primary Examiner*—Steven L. Stephen
*Assistant Examiner*—Judson H. Jones

[57] ABSTRACT

An electromagnetic actuator has a fixed part (1,2,3,4) constructed of ferrite material and a sliding part (15) constructed of electrically conductive material. The fixed part comprises an outer tubular portion (2), a central disc (1) and two central core members (3 and 4) secured on either side of the disc (1). The sliding part (15) comprises two annular elements (9 and 10) arranged to slide in the gaps (5 and 6) between the cores (3 and 4) and the outer tubular portion (2). Coils (7 and 8) are positioned round the central cores (3 and 4). The two annular elements (9 and 10) are rigidly coupled together by means of a shaft (14) extending through the cores(3 and 4). The actuator acts as a position controller by control of the relative magnitudes of the ac currents supplied to the coils. It can also act as a force applier when the sliding part (15) is moved to a predetermined position and only one coil is energized. For use as a reciprocating linear motor the coils (7 and 8) are energized alternately with switching taking place when the sliding part (15) reaches respective end of travel positions.

11 Claims, 3 Drawing Sheets

ELECTROMAGNETIC ACTUATORS

BACKGROUND OF THE INVENTION

This invention relates to electromagnetic actuators. It is particularly concerned with linear actuators which have application in positioning, in applying force to a workpiece and in reciprocating motion.

In our earlier European Patent Application No. 96303854.2 there is described and shown an actuation apparatus comprising two similar parts rigidly secured together. Each part comprises a cylindrical iron structure having an outer hollow tubular portion and an inner portion, the two portions being linked by end plates to define an annular gap between them so that in longitudinal cross-section each part is generally E-shaped. The two parts face each other and define a common annular cavity between their outer and inner portions. A copper tube is arranged to be laterally slidable in the cavity. To transfer motion of the copper tube externally of the cavity the outer portions have longitudinally extending slots and radial spokes are secured to the copper tube and extend through the slots. Electric coils surround each of the inner portions at their roots and ac energization of the coils causes movement of the copper tube due to the interaction of the eddy currents induced in the copper tube with the magnetic field in the iron structures. The nature of the force/displacement characteristics of the copper tube when a coil is energized is such that its position can be changed by differential energization of the two coils so that the apparatus acts as a positioning device.

SUMMARY OF THE INVENTION

It is an object of the invention to provide an electromagnetic actuator of improved construction and of more versatile application.

According to the invention an electromagnetic actuator comprises a fixed part constructed of ferromagnetic material and a moveable part constructed of electrically conductive material, the fixed part comprising an outer hollow tubular portion and a central core positioned to define an annular gap between the outer portion and the core, the moveable part being located in the gap and constrained to linearly slide therein, and electrical coils wound round the central core and is characterized in that the fixed part includes a disc centrally positioned in said gap to divide the gap longitudinally into two shorter gaps on either side thereof, the central core is in two portions each secured to opposite faces of the disc, an electrical coil being wound round each portion of the core, and in that the moveable part comprises two separate annular elements each slidable in a respective one of the said shorter gaps, and means for securing the said elements rigidly to each other so that they slide in unison.

In carrying out the invention the securing means may comprise a central bore extending through both portions of the core, a shaft slidably moveable in the said bore, and means for rigidly securing the annular elements of the moveable part to opposite ends of the shaft. Preferably the shaft is mounted on linear bearings within the central bore.

Preferably the portions of the central core are of increasing diameter in the direction away from the central disc and the increase in diameter is achieved by stepped increases in diameter.

The actuator can act as a positioning device. In this mode the two coils are energized differentially and the conducting tubes take up a position dependent on the relative magnitudes of the currents flowing in the two coils. The actuator can also act as a force applier. In this mode only one coil is energized. By alternately energizing the two coils linear reciprocating motion can be generated.

BRIEF DESCRIPTION OF THE DRAWINGS

In order that the invention may be more fully understood reference will now be made to the accompanying drawings in which.

DETAILED DESCRIPTION

Figure 1:
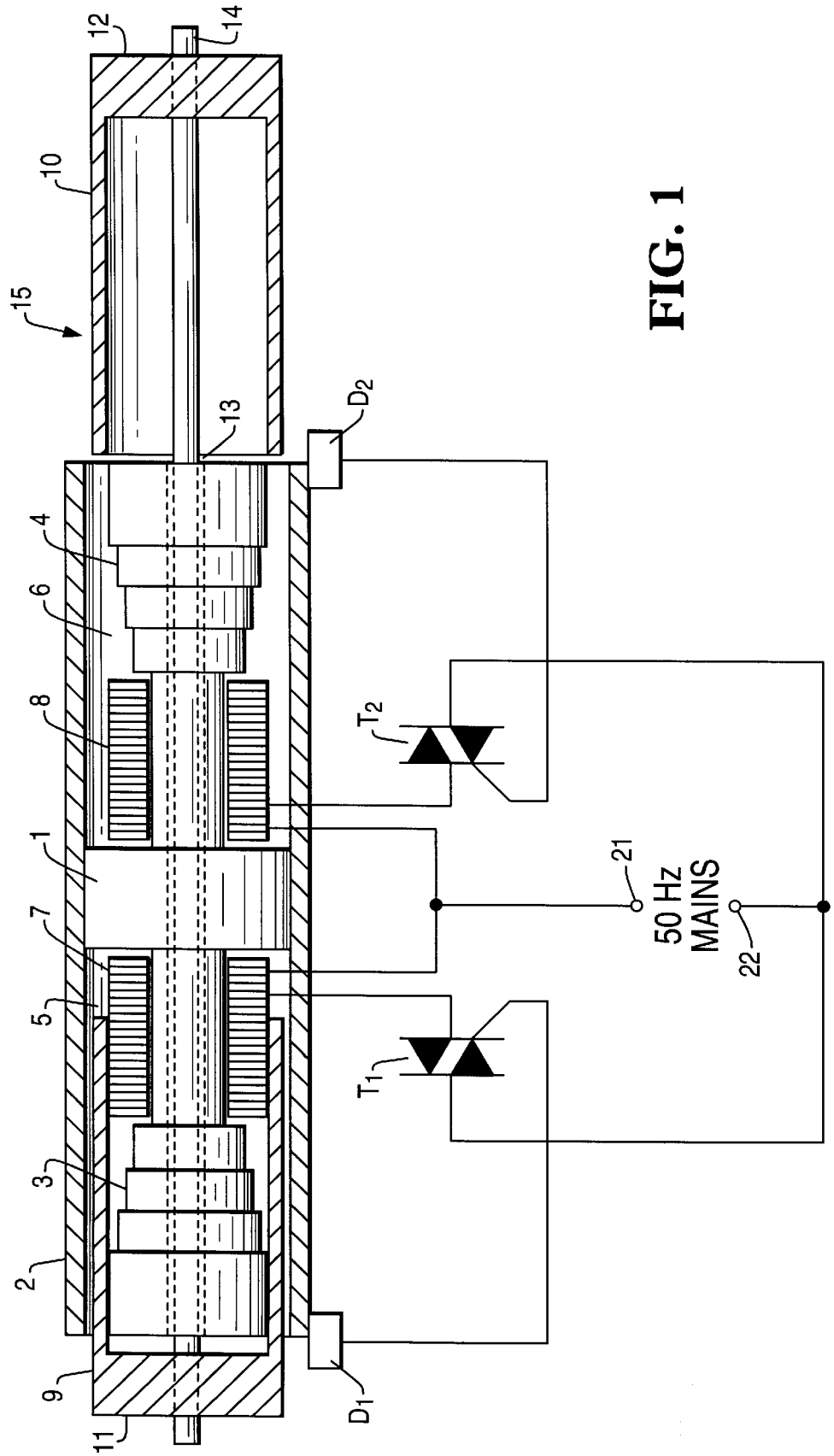
FIG. 1 is a longitudinal section of an actuator embodying the invention.

Referring now to FIG. 1 there is shown therein in longitudinal cross-section an actuator having a fixed part constructed of ferrite material and a moveable part constructed of electrically conductive material. The fixed part comprises a central thick cylindrical disc 1 to which is rigidly secured an outer thin-walled cylindrical tube 2. Tube 2 extends longitudinally for some distance on either side of disc 1. Two central ferrite cores 3 and 4 are secured to either side of disc 1 and extend axially in opposite directions within the volume defined by tube 2. Annular gaps 5 and 6 are defined in the space between cores 3 and 4 and the outer cylindrical wall 2.

Cores 3 and 4 are both stepped so that their diameter increases with distance from disc 1. Electric coils 7 and 8 are positioned round the central cores 3 and 4 close to disc 1 and within the annular gaps 5 and 6.

The moveable part of the actuator comprises two thin-walled tubes 9 and 10 having solid ends 11 and 12. Tubes 9 and 10 are positioned within gaps 5 and 6 and are free to slide longitudinally therein. They may conveniently be formed of aluminum or copper. Tubes 9 and 10 are secured together so that they slide in unison. For the purpose of securing the tubes to each other a central bore 13 is provided extending right through both cores 3 and 4. A no shaft 14 extends within bore 13 and its ends are rigidly coupled to the end discs 11 and 12 of the tubes 9 and 10. To facilitate the sliding movement of shaft 14 linear bearings may be provided between shaft 14 and the inner surface of bore 13. Tubes 9 and 10 and the shaft 14 coupling them together form a composite member 15 capable, within limits, of linear motion in either of two opposite directions.

Figure 2:
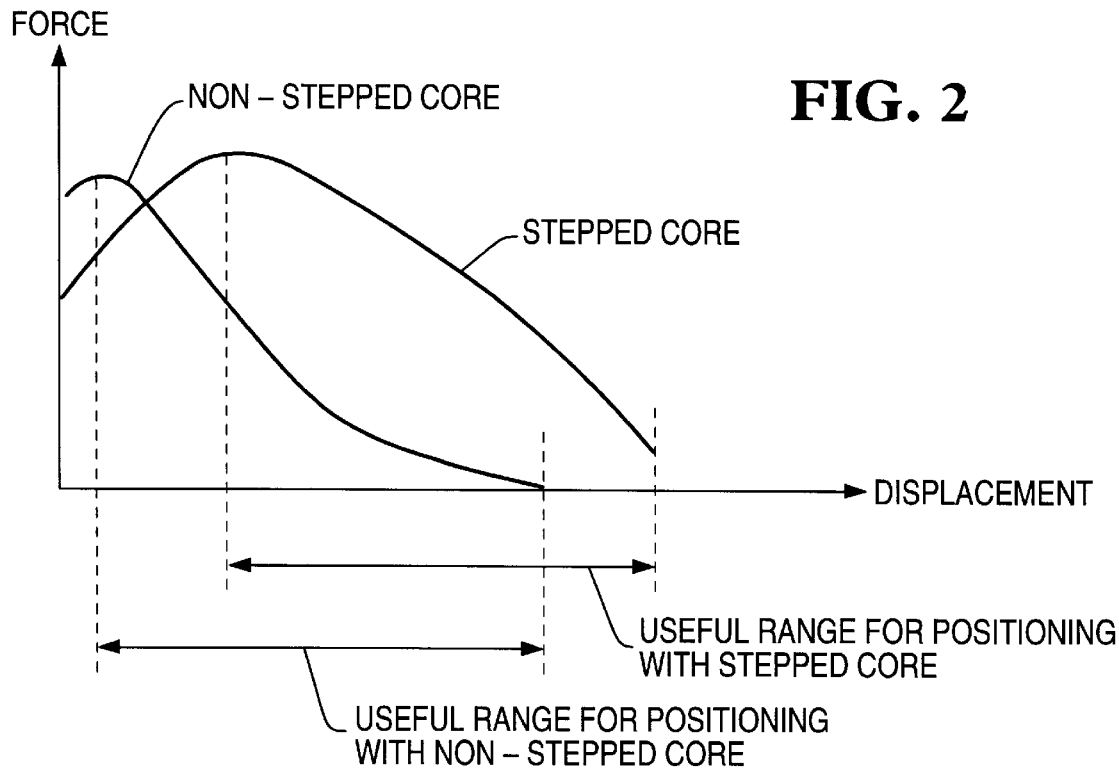
FIG. 2 shows a force/displacement curve for the actuator of FIG. 1.

The operation of the actuator of FIG. 1 depends on the manner in which the two coils 7 and 8 are energized. The effect of energization of coil 7 or 8 with ac current, conveniently a 50 Hz mains supply, is to generate an alternating magnetic field in the ferrite elements which in turn generates eddy currents in conducting member 15. The eddy current reacts with the magnetic field to create a force which acts outwardly on conducting member 15. If only one coil is being supplied with ac current then the force/displacement relationship is as shown in FIG. 2. It will be seen that, for the stepped core provided, as member 15 slides out from a central position the force increases slightly over a small range and thereafter decreases with displacement in a fairly linear manner. For comparison the force/displacement curve for a non-stepped core is also shown to the same scale. It will be seen that over nearly all the range of movement of member 15 the applied force on it is noticeably greater with a stepped core.

To operate the actuator as a linear reciprocating motor The circuit arrangement shown in FIG. 1 may be used. The two coils 7 and 8 are both energized through triacs $T_1$ and $T_2$ from terminals 21 and 22 connected to a 50 Hz mains electrical supply. The firing of triacs $T_1$ and $T_2$ is controlled by photo-diode sensors $D_1$ and $D_2$ in such a manner that the coils are energized alternately. At any one time the firing angle of one triac is 00 and the firing angle of the other triac is 1800, that is to say one triac is 'on' and the other triac is 'oft'. To this end the photo-diodes $D_1$ and $D_2$ detect the opposite end of travel positions of member 15 and trigger the triacs accordingly.

Figure 3:
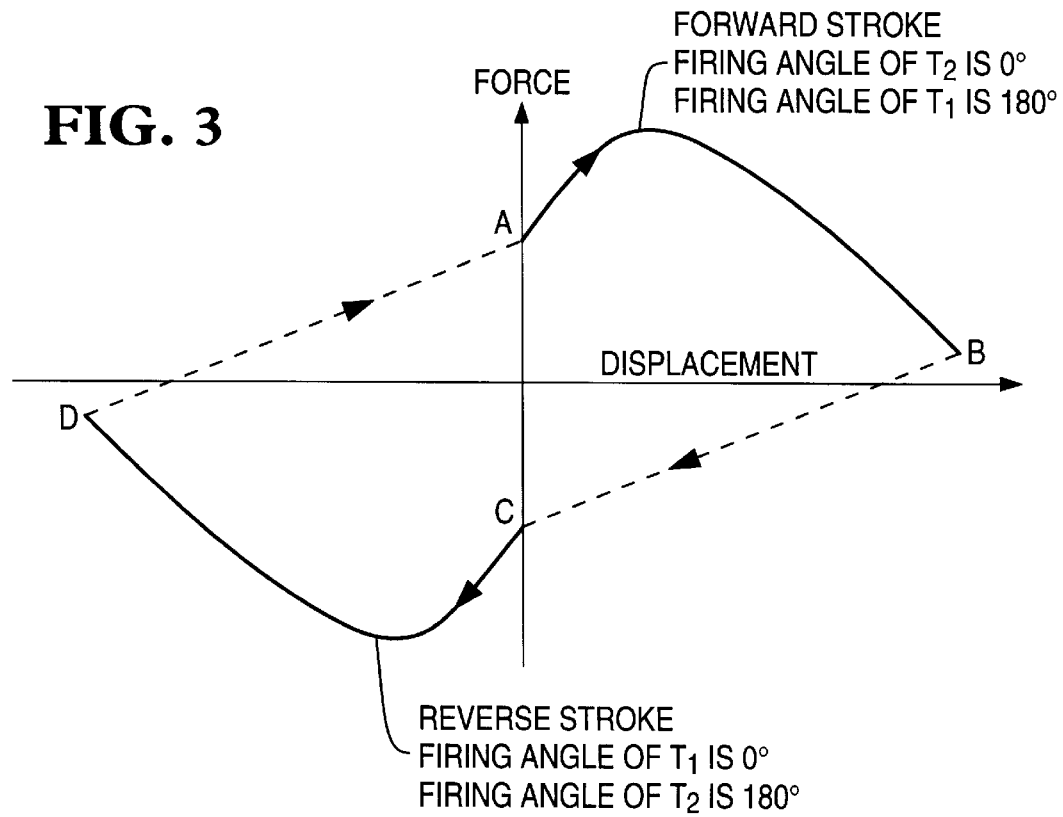
FIG. 3 shows the force displacement curve when the actuator is arranged for continuous reciprocal motion.

The movement of the sliding member is illustrated in FIG. 3. At a central position marked A in FIG. 3 the firing angle of triac $T_2$ is 00 so that coil 8 is energized or 'on' while the firing angle of $T_1$ is 1800 so that coil 7 is unenergized or 'off'. Accordingly the member moves rightwards until it reaches the end of its travel at B as detected by photo-diode $D_2$. At that point the firing angle of triac $T_2$ changes to 1800 so that coil 8 is turned off. Simultaneously photo-diode $D_1$ also detects the end of travel of the member and accordingly the firing angle of triac $T_1$ chances to 00 and coil 7 is turned on. The member now moves fully leftwards as shown by its movement from B to C and thence to D. At this point the photo-diodes detect the end of leftwards travel and cause the reversal of the firing angles of the respective triacs and corresponding reversal of motion of the member from D to A and thence to B again. The speed of reciprocation of the sliding member depends on the load attached to it.

Figure 4:
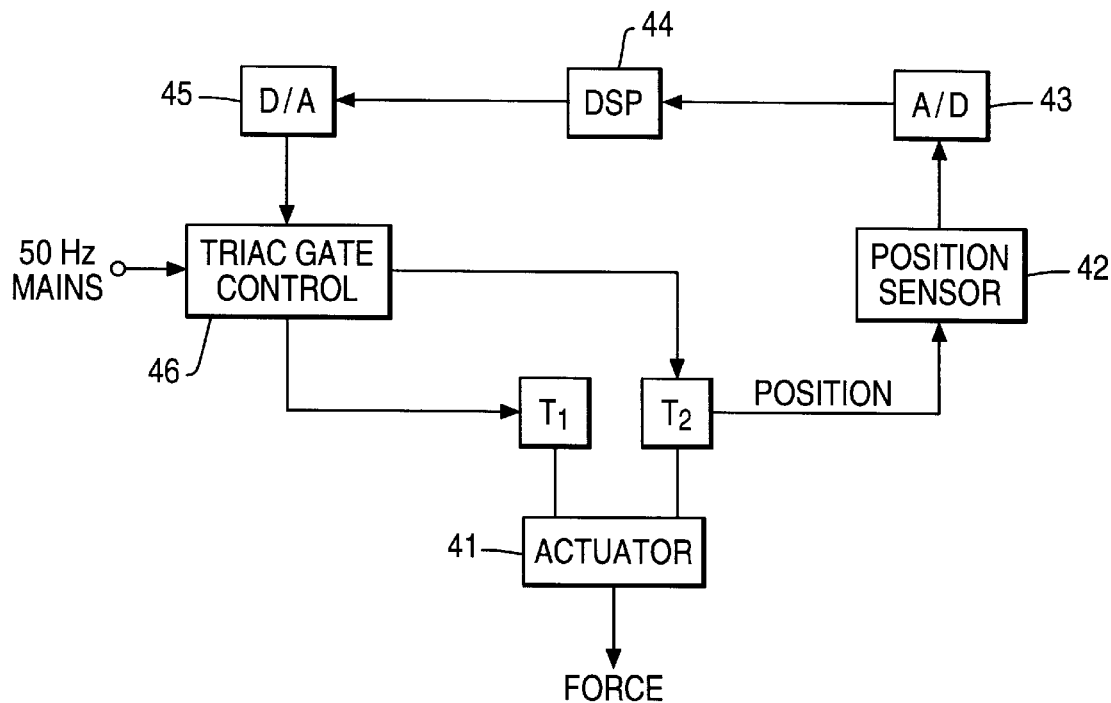
FIG. 4 is a block diagram of the electric control circuit required for operation of the actuator as a positioning device.
Figure 5:
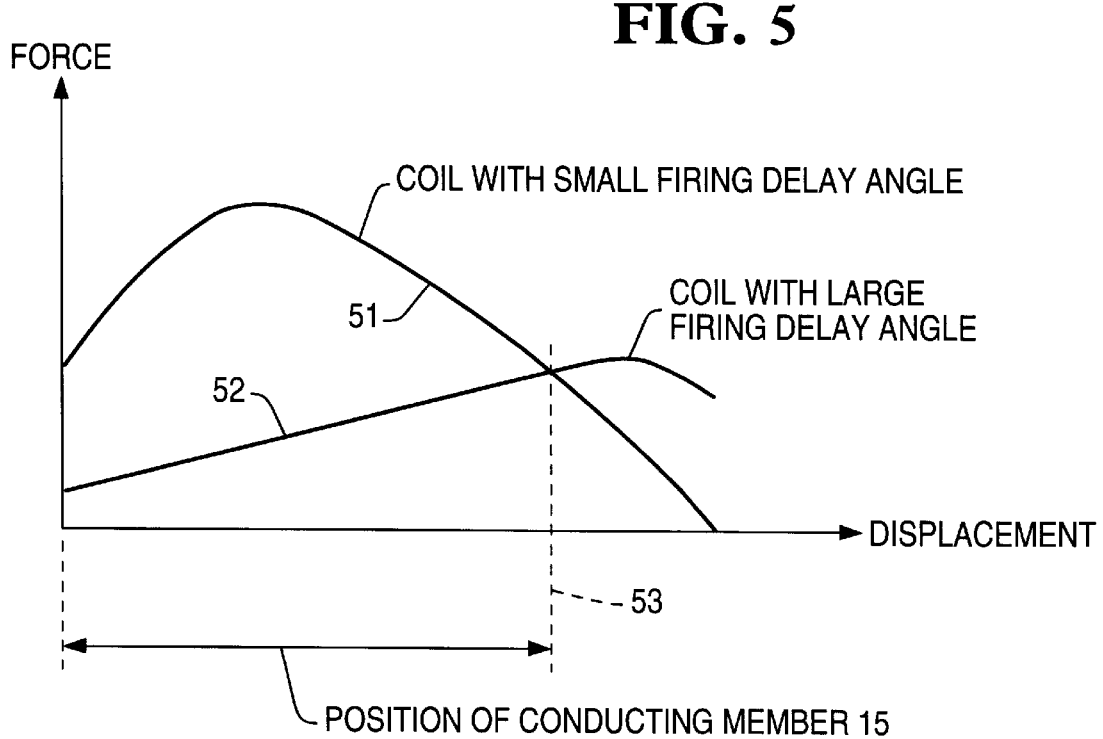
FIG. 5 is a diagram explanatory of the operation of the circuit of FIG. 4.

For operation as a positioning device the diodes $D_1$ and $D_2$ are replaced by a single continuous position sensor and the firing angles of the triacs $T_1$ and $T_2$ become continuous variables. A circuit diagram of a suitable arrangement is shown in FIG. 4. In FIG. 4 the actuator of FIG. 1 is shown in block diagrammatic form as actuator 41. Actuator 41 is supplied with electric power through two triacs $T_1$ and $T_2$ in an arrangement similar to that shown in FIG. 1. However instead of photo-diodes which detect only end travel a position sensor 42 is provided which continuously detects the position of the sliding member and provides an analogue output proportional to position. The output of sensor 42 is fed through an analogue-to-digital converter 43 to a digital signal processor 44 and thence through a digital-to-analogue converter 45 to a triac gate control circuit 46. Control circuit 46 provides firing pulses to the triacs $T_1$ and $T_2$. The effect of different firing angles on the force/displacement relationship of the actuator is illustrated in FIG. 5. Where a small firing angle is used the resultant force/displacement relationship is as shown by curve 51. Curve 51 shows that the applied force decreases fairly linearly with distance. Where a large firing angle is used the force/displacement curve is shown at 52. Curve 52 shows that the applied force increases fairly linearly with distance. By firing both triacs from control circuit 46 opposing forces are applied to member 15 and the member will be driven to an equilibrium position where these forces become equal and opposite. Such a position is shown at 53 in FIG. 5. The actual position of equilibrium depends on the angles relative to the mains supply of the firing pulses of the triacs generated in control circuit 46.

The closed loop circuit of FIG. 4 thus enables precise positioning of member 15 to be achieved over a wide range of positions and with large return forces against any movement from the equilibrium position.

It is also readily possible to operate the actuator of FIG. 1 as a force imparting device. When only one coil is energized the force applied to member 15 at any position is as shown in FIG. 2. Conversely to apply any given value of force the required position of member 15 is known from FIG. 9. The actuator is initially operated as a positioning device in the manner described above to move member 15 to the required position. The position of the workpiece relative to member 15 may be adjusted at this stage to compensate for this movement. The supply to both coils is then turned off. This may be accomplished by changing the firing angles of both triacs to 1800. The firing angle of only one of the triacs is then changed to 00 thus ensuring that it is fully on and the coil to which it is connected is supplied with the maximum current to ensure that the force applied to member 15 and thus any workpiece to which it is connected has the predetermined value. The direction of the applied force depends on which of the two coils 7 or 8 is energized. It is thus possible to apply either a tensile or a compressive force to a workpiece attached to member 15, as desired.

In all of the functions of the actuator described above no sliding electrical contacts are required. The sliding member 15 has no external electrical contacts and has the robustness of a squirrel cage of a conventional induction motor. The actuator can thus be used in hostile environments.

What is claimed is:

1. An apparatus comprising:
   a fixed part constructed of ferromagnetic material and including an outer hollow tubular portion and a central core positioned relative to the outer hollow tubular portion to define an annular gap therebetween, the fixed part including a disc centrally positioned in the gap to divide the gap longitudinally into two shorter gaps on either side thereof, the central core including two portions each secured to opposite faces of the disc;
   a first electrical coil wound around one portion of the core,
   a second electrical coil wound around the other portion of the core;
   a moveable part constructed of electrically conductive material and being located in the gap and constrained to linearly slide therein, the moveable part including two separate annular elements each slidable in a respective one of the shorter gaps; and
   means for securing the elements rigidly to each other such that the elements can slide in unison.

2. An apparatus according to claim 1, wherein the securing means includes (i) means defining a central bore extending through both portions of the core, (ii) a shaft slidably moveable in the central bore, and (iii) means for rigidly securing the annular elements of the moveable part to opposite ends of the shaft.

3. An apparatus according to claim 2, wherein the shaft is mounted on linear bearings disposed within the central bore.

4. An apparatus according to claim 3, wherein the portions of the central core are of increasing diameter in a direction away from the central disc.

5. An apparatus according to claim 4, wherein the increase in diameter of the portions of the central core is achieved by stepped increases in diameter.

6. An apparatus according to claim 1, further comprising (i) electrical supply connections for the coils, (ii) individual switches for each coil, and (iii) means for operating the switches simultaneously and oppositely between 'ON' and 'OFF' positions when the moveable part reaches end of travel positions.

7. An apparatus according to claim 6, wherein the switches include triacs, the operating means for the switches changing the angles of the firing pulses of the triacs between zero degrees and 180 degrees to operate the switches between 'ON' and 'OFF'.

8. An apparatus according to claim 1, further comprising (i) electrical supply connections for the coils, and (ii) control means for individually controlling the magnitudes of the electric currents supplied to each coil to enable the moveable part to move to a position dependent upon the relative magnitudes of the currents in the coils.

9. An apparatus according to claim 8, wherein the control means includes (i) triacs in the path from the electrical supply means to the coils, and (ii) means for controlling the angles of the firing pulses to the triacs.

10. An apparatus according to claim 9, further comprising (i) a position sensor for determining the position of the moveable part, and (ii) a closed loop control circuit for modifying the angles of the firing pulses of the triacs in accordance with an output of the position sensor.

11. An apparatus according to claim 1, further comprising (i) means for moving the moveable part to a predetermined position, and (ii) means for energizing a selected one of the coils when the moveable part is in the aforesaid position.

* * * * *